United States Patent Office 3,433,853
Patented Mar. 18, 1969

3,433,853
POLYOLEFIN COMPOSITIONS CONTAINING A BASIC POLYAMIDE DYE SITE ADDITIVE
Ralph H. Earle, Claymont, Del., and Alfred C. Schmalz, Hollins, and Charles A. Soucek, Covington, Va., assignors to Hercules Incorporated, Wilmington, Del., a corporation of Delaware
No Drawing. Filed May 25, 1966, Ser. No. 552,722
U.S. Cl. 260—857 4 Claims
Int. Cl. C08f 29/12; D06p 3/24

ABSTRACT OF THE DISCLOSURE

The acid dyeability of olefin polymers is improved by incorporation of a minor amount of a polyamide resin based on a linear aliphatic dicarboxylic acid and a polyamine containing two primary or secondary amine groups and at least one tertiary amine group.

---

This invention relates to modified olefin polymers having an improved affinity for acid dyestuffs, in particular, to shaped articles formed from mixtures of stereoregular polyolefins with certain basic polyamides.

It is well known that articles of polyolefins can normally be dyed only with difficulty due to the complete lack of polar groups in the polymer molecule to form points of attachment for the dye molecules. In an effort to overcome this difficulty, it has been proposed to incorporate in the polyolefin, prior to the shaping process, a polyamide formed by the polycondensation of a dicarboxylic acid and a polyamine having two primary and one or more secondary amine groups, such as diethylenetriamine and triethylenetetramine, and optionally a diamine as a replacement for a portion of the polyamine. While this has resulted in improvements in some respects, it has not been completely satisfactory in others. Thus, during spinning, such additives apparently take part in branching and crosslinking reactions in the extruder, and eventually cause a pressure build-up in the system sufficient to require termination of the spin. Moreover, these additives degrade in the presence of air to form deposits on the discharge face of the jet. These deposits gradually increase in mass to the point where they physically interfere with spin continuity by coming in contact with the filament, thus causing a spin break.

It has now been found that the above disadvantages can be overcome by incorporating with the polyolefin a basic polyamide formed by the reaction of one or more dicarboxylic acids or suitable derivatives thereof, e.g., esters of dicarboxylic acids, with a polyamine having not more than two primary amine groups and one or more tertiary amine groups. Optionally, part of the polyamine reactant may be replaced by a diamine. These compositions can be spun into fibers without excessive pressure build-up and without degradation of the additive.

Accordingly by the present invention there is provided a polyolefin composition comprising 80 to 99.5% by weight of a stereoregular polyolefin and 0.5 to 20% by weight of a basic polyamide of the indicated type, said basic polyamide being present in an amount sufficient to provide 0.1 to 1.0% by weight of basic nitrogen in the composition.

The basic polyamides, according to the invention, are condensation polymers which are substantially insoluble in water and which have a crystallite melting point (measured using a Fisher-Johns melting point apparatus) of from about 50° C. to about 250° C. If the crystallite melting point of the basic polymer exceeds about 250° C., the polyolefin composition containing it becomes less easily shaped into uniform articles. These polymers, moreover, do not undergo branching and crosslinking during extrusion of the polyolefin compositions and do not degrade during processing.

In the preparation of these polyamides, the dicarboxylic acid or derivative thereof is reacted with the polyamine and optionally a diamine at temperatures from about 75° C. to about 250° C. for a period of time from about ¼ hour to about 6 hours until volatiles are substantially completely removed. The dicarboxylic acid or derivative thereof can be used alone or in combination with another acid. The proportion of dicarboxylic acid or derivative thereof to polyamine or polyamine and diamine will preferably be from about 0.95:1 to about 1.10:1. It will be realized, of course, that proportions outside this range can be used with somewhat less satisfactory results. The diamine can be used to replace up to about 60% or more by weight of the polyamine. Since the solubility in or compatibility with the polyolefins of basic polyamides according to the invention is controlled largely by the length of the carbon chain or chains in the reactants, it is preferred that at least one of the reactants have at least one carbon chain of 4–12 carbon atoms. Alternatively, a monofunctional reactant, which may be an amine or carboxylic acid, may be used in the polymerization process both to control the molecular weight of the polymer produced or its compatibility with the polyolefin in which case a carbon chain length of 4–24 atoms is preferred.

The dicarboxylic acid or derivative thereof can be of the aliphatic, aromatic, and heterocyclic types. Aliphatic acids which can be used to produce the basic polyamides are oxalic, malonic, succinic, glutaric, adipic, pimelic, suberic, azelaic, sebacic and acids of the formula $HOOC—(CH_2)_n—COOH$ where $n$ is $>8$. Typical aromatic dicarboxylic acids which can be used are phthalic, isophthalic, terephthalic and acids of the formula

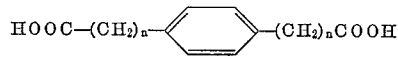

where $n$ is 1 or more. Typical heterocyclic acids which can be used herein are dicarboxylic acids of N-substituted piperidines, dicarboxylic acids of quinoline and isoquinoline, and $\omega,\omega'$-N-substituted dicarboxylic acids, e.g.,

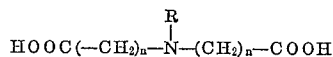

where R can be aliphatic (branched or unbranched), cycloaliphatic, aryl or heterocyclic.

As previously indicated, the polyamines contemplated for use herein contain not more than two primary amino groups and one or more tertiary amino groups. One class of such polyamines suitable for use herein are those having the general formula

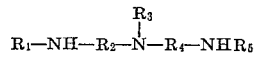

where $R_2$ and $R_4$ can be aliphatic (branched or unbranched), cycloaliphatic or aryl and can be the same or different, $R_1$ and $R_5$ can be hydrogen, aliphatic (branched or unbranched), cycloaliphatic or aryl and can be the same or different, and $R_3$ is aliphatic (branched or unbranched), cycloaliphatic, aryl, or heterocyclic. Typical examples of this class of polyamines are N,N'-bis(3-aminopropyl)methyl amine which has the following formula

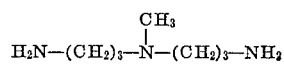

and bis-(4-α-aminotolyl)-methyl amine which has the following formula

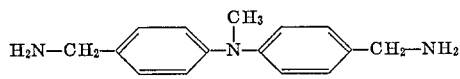

Another class of polyamines suitable for use herein are those having the following general formula

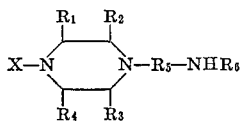

where $R_1$, $R_2$, $R_3$ and $R_4$ can be hydrogen, aliphatic (branched or unbranched), cycloaliphatic, aryl, hydroxy, alkoxy, or heterocyclic and can be the same or different, $R_5$ can be aliphatic (branched or unbranched), cycloaliphatic, aryl or heterocyclic, $R_6$ can be hydrogen, aliphatic (branched or unbranched), cycloaliphatic, aryl or heterocyclic, and X can be H or the group $R_6NHR_5$— where $R_5$ and $R_6$ are the same as above.

Typical examples of this class of polyamines are N-aminoethyl piperazine which has the following formula

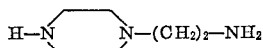

cis- or trans-2,5-dimethyl-N-aminoethyl piperazine which has the following formula

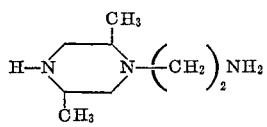

N,N'-bis-(β-aminoethyl)-piperazine which has the following formula

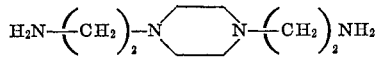

N,N'-bis-(β - aminoethyl) - (cis or trans) - 2,5 - dimethyl piperazine which has the following formula

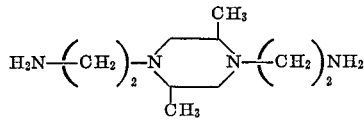

Still another class of polyamines suitable for use herein are those which have the following formula

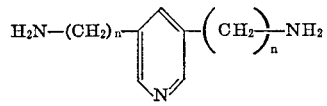

where $n=0$ to 16.

The diamines contemplated for use herein as an optional replacement for a portion of the polyamine can be alkylidene diamines, e.g., ethylenediamine, trimethylenediamine, tetramethylenediamine, pentamethylenediamine, hexamethylenediamine and diamines of the formula $H_2N(-CH_2)_nNH_2$ where $n$ is >6; aromatic diamines of the formula

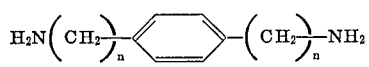

where $n=0$ to 16; 4,4'-diaminobiphenyl, cycloaliphatic diamines, e.g., 1,4-diaminocyclohexane, p-phenylenediamine, etc.

The polyolefin compositions of the invention can be prepared by intimately mixing the polymers by any method, as for example, by tumbling the powdered polymers together, by mixing of the powdered polyolefin with a solution of the basic polymer in a volatile solvent, followed by drying and granulation of the mixture or by milling the polymers in a hot roll or Banbury mixer. Uniform and intimate mixture of the polymers can be facilitated by the addition of dispersing agents as, for example, surface-active agents such as long chain fatty alcohols.

The amount of basic polyamide contained in the polyolefin compositions of this invention is to some extent dependent upon the particular polymer used and the depth of shade required in articles shaped therefrom. In general, 0.5–20% by weight of the composition, preferably 1–10%, is an adequate amount and this amount of additive does not interfere with the processing of the polyolefin or impair the properties of the articles shaped therefrom. As the acid dye affinity is primrarily dependent upon the amount of basic nitrogen present in the composition, and as the basic nitrogen content of the added basic polymer may vary, it is preferred to control the amount of added polymer, within the foregoing limits in terms of the basic nitrogen content of the polyolefin composition. For pale dyeings, as little as 0.1% basic nitrogen may be used but for the highest build-up of color and the deepest shades a larger amount is required. In general 0.1–1.0% by weight of basic nitrogen in the mixture is sufficient for all purposes.

The present invention can be applied to any stereoregular polyolefin, and it has been found to be particularly useful for enhancing the acid dye affinity, in particular for acid dyestuffs or premetallized dyestuffs, of shaped articles of stereoregular polyolefins (as, for example, linear polyethylene, stereoregular poly(4-methylpentene-1) or isotactic polypropylene), from which useful textile fibers or filaments may be produced by melt or solution spinning. The invention is not limited to enhancing the acid dye affinity of articles for textile uses but may be equally readily applied to other shaped articles of stereoregular polyolefins as, for example, films, moldings or extrusions.

The examples which follow illustrate the nature of the invention and the manner in which it may be performed. In these examples all parts and percentages are by weight and melting points are crystallite melting points determined by means of a Fisher-Johns melting point apparatus.

Example 1

Abasic polyamide containing tertiary amine groups was prepared from the following ingredients in the indicated proportions:

| | Moles |
|---|---|
| Azelaic acid | 1.50 |
| Hexamethylenediamine (60% aqueous) | 0.7875 |
| N,N'-bis-(3-aminopropyl)methyl amine | 0.7875 |

The azelaic acid was placed into a 500-ml. resin kettle equipped with a stainless steel stirrer, take-off condenser, nitrogen inlet, thermometer and addition funnel. The amines were added conjugately to the acid melt (115° C.) with stirring in an atmosphere of nitrogen. The amine addition should take from 20 to 30 minutes. When the amines had been added, the temperature was raised to 175° C. for 2 hours. Finally, a vacuum (50 mm. Hg) was applied for 30 minutes. The product was quickly poured into an aluminum pan and allowed to cool in a desiccator over $CaSO_4$ in a nitrogen atmosphere. The resulting product was white in color and had a melting point range of 163° C.–167° C. and a relative viscosity (2% solution in 90% formic acid at 25° C.) of 1.64.

A basic polyamide containing secondary amine groups was similarly prepared from the following ingredients:

| | Moles |
|---|---|
| Sebacic acid | 1.50 |
| Hexamethylenediamine (60% aqueous) | 0.7875 |
| Diethylene triamine | 0.7875 |

The product had a viscosity (2% solution in 90% formic acid at 25° C.) of 1.8 to 1.9.

Polyamides, prepared as above described, were mixed with isotactic polypropylene (polyamide, 7.5 parts; polypropylene, 92.5 parts) and each mixture then extruded at temperatures from about 200–210° C. through a 325- mesh screen and die to form strands which were then fed through cooling water and a cutter to form pellets.

At the end of 9 hours, the pressure, in the case of the polypropylene composition containing the polyamide made from the polyamine containing secondary amino groups, had increased to 650 p.s.i. By contrast, in the case of the polypropylene composition containing the polyamide made from the polyamine containing tertiary amino groups, the pressure at the end of 11 hours was 100 p.s.i.

Polypropylene compositions containing these polyamides were also extruded through a 180-mesh screen and spun into yarn. Based on several runs, in the case of the polypropylene composition containing the polyamide made from the polyamine containing the secondary amine groups, there was a severe deposit on the jet face after from about 12 to about 15 hours spinning. In the case of the composition containing the polyamide made from the polyamine containing tertiary amine groups, there was no deposit on the jet face after 30 hours spinning.

Example 2

Polyamides were prepared from the following formulations following the procedure of Example 1.

(1) Moles
Polymer grade sebacic acid _____ 1.50
Hexamethylenediamine (60% aqueous) _____ 0.7875
N,N'-bis-(3-aminopropyl)methyl amine _____ 0.7875

(2)
Sebacic acid _____ 2.00
Hexamethylenediamine (70% aqueous) _____ 1.05
N-aminoethyl piperazine _____ 1.05

(3)
Azelaic acid _____ 2.00
Hexamethylenediamine (70% aqueous) _____ 1.05
N'-aminoethyl piperazine _____ 1.05

The resulting polyamides had the characteristics shown in the following table:

TABLE

| Polyamide | Relative viscosity [1] | Melting range (°C.) | Color |
|---|---|---|---|
| From (1) | 1.25 | 170–176 | White. |
| From (2) | 1.52 | 177–182 | Pale yellow. |
| From (3) | 1.53 | 164–170 | Do. |

[1] 2% solution in 90% formic acid at 25° C.

These polyamides were mixed with isotactic polypropylene and then evaluated in extrusion and spinning in comparison with polypropylene compositions containing a polyamide prepared utilizing a polyamine containing secondary amine groups, following the procedure of Example 1. The results were comparable to those obtained in Example 1.

What we claim and desire to protect by Letters Patent is:

1. An acid-dyeable polyolefin composition comprising 80 to 99.5% by weight of a stereoregular polyolefin and 0.5 to 20% by weight of a basic polyamide comprising the reaction product of an aliphatic dicarboxylic acid or derivative thereof and a polyamine containing not more than two primary amino groups and one or more tertiary amino groups, wherein said basic polyamide is present in an amount sufficient to provide 0.1 to 1.0% by weight of basic nitrogen in the composition and said basic polyamide has a crystallite melting point in the range 50–250° C.

2. A polyolefin composition according to claim 1 wherein up to 60% of the polyamine is replaced by a diamine.

3. A polyolefin composition according to claim 2 wherein the polyamine is methyl bis(3-aminopropyl) amine and the diamine is hexamethylenediamine.

4. A polyolefin composition according to claim 3 wherein the polyolefin is selected from the group consisting of linear polyethylene stereoregular poly-(4-methylpentene-1) and isotactic polypropylene.

References Cited

UNITED STATES PATENTS

| 3,161,608 | 10/1964 | Caldwell | 260—857 |
| 3,317,633 | 5/1967 | Tesoro | 260—857 |
| 3,320,334 | 5/1967 | Bonvicini | 260—857 |
| 3,326,826 | 6/1967 | Cohen | 260—857 |
| 3,331,888 | 7/1967 | Cantatore | 260—857 |

MURRAY TILLMAN, *Primary Examiner.*

PAUL LIEBERMAN, *Assistant Examiner.*

U.S. Cl. X.R.

260—78; 8—55